United States Patent
Won et al.

(10) Patent No.: US 7,415,604 B2
(45) Date of Patent: Aug. 19, 2008

(54) METHOD FOR ADJUSTING AN OPERATING RATE OF A GRAPHICS CARD

(75) Inventors: Ming-Ting Won, Taipei (TW);
Fu-Shuen Wu, Taipei Hsien (TW);
Chi-Chun Wu, Tao-Yuan Hsien (TW);
Kuo-Hua Liao, Taipei (TW)

(73) Assignee: Micro-Star Int'l Co., Ltd., Jung-He, Taipei Hsien (TW)

( * ) Notice: Subject to any disclaimer, the term of this patent is extended or adjusted under 35 U.S.C. 154(b) by 433 days.

(21) Appl. No.: 11/160,590

(22) Filed: Jun. 29, 2005

(65) Prior Publication Data
US 2006/0248356 A1 Nov. 2, 2006

(30) Foreign Application Priority Data
Apr. 28, 2005 (TW) .............. 94113701 A

(51) Int. Cl.
*G06F 1/00* (2006.01)
*G06F 15/177* (2006.01)
(52) U.S. Cl. .......... 713/100; 713/300; 713/310; 713/320; 713/321; 713/322; 713/330
(58) Field of Classification Search ......... 713/300–340, 713/100; 345/501–522
See application file for complete search history.

(56) References Cited

U.S. PATENT DOCUMENTS

| | | | |
|---|---|---|---|
| 5,848,282 A * | 12/1998 | Kang ................... | 713/323 |
| 6,487,668 B2 * | 11/2002 | Thomas et al. ........ | 713/322 |
| 6,836,849 B2 * | 12/2004 | Brock et al. .......... | 713/310 |
| 6,996,441 B1 * | 2/2006 | Tobias ................. | 700/44 |
| 7,005,871 B1 * | 2/2006 | Davies et al. ......... | 324/763 |
| 2003/0023889 A1 * | 1/2003 | Hofstee et al. ....... | 713/322 |
| 2005/0030171 A1 * | 2/2005 | Liu et al. ............. | 340/500 |
| 2005/0039067 A1 * | 2/2005 | Tsau et al. ........... | 713/600 |
| 2005/0049729 A1 * | 3/2005 | Culbert et al. ....... | 700/50 |
| 2005/0057571 A1 * | 3/2005 | Stevens .............. | 345/501 |
| 2005/0060122 A1 * | 3/2005 | Lin et al. ............ | 702/183 |
| 2005/0182978 A1 * | 8/2005 | Anderson et al. ..... | 713/300 |
| 2005/0212781 A1 * | 9/2005 | Clapper .............. | 345/184 |
| 2006/0004538 A1 * | 1/2006 | Cancel ............... | 702/136 |
| 2006/0044219 A1 * | 3/2006 | Kao et al. ........... | 345/7 |
| 2007/0174650 A1 * | 7/2007 | Won et al. ........... | 713/600 |

FOREIGN PATENT DOCUMENTS

TW 571190 1/2004

* cited by examiner

*Primary Examiner*—Nitin C. Patel
*Assistant Examiner*—Fahmida Rahman
(74) *Attorney, Agent, or Firm*—Winston Hsu

(57) ABSTRACT

A method for increasing an operating rate of a graphics card includes: raising a rotation rate of a radiator fan of a graphics processing unit chip of the graphics card to a first rotation rate according to a rate increasing command; raising a voltage inputted to the graphics processing unit chip to a first voltage, and raising a voltage inputted to a memory of the graphics card to a second voltage when the rotation rate of the radiator fan is approximately equal to the first rotation rate; and raising a timing of the graphics processing unit chip to a first timing, and raising a timing of the memory to a second timing when the voltage inputted to the graphics processing unit chip is approximately equal to the first voltage, the voltage inputted to the memory being approximately equal to the second voltage.

4 Claims, 4 Drawing Sheets

METHOD FOR ADJUSTING AN OPERATING RATE OF A GRAPHICS CARD

BACKGROUND OF THE INVENTION

1. Field of the Invention

The present invention provides a method for adjusting an operating rate of a graphics card, and more particularly, a method for adjusting the operating rate safely.

2. Description of the Prior Art

As multimedia technology improves, the efficiency of graphics displays in a computer system increases a lot. Generally, in order to ensure a workable graphics card, graphic-card manufacturers set parameters of the graphics card with a safety setting, such as a lower operating rate. Therefore, in the graphics card, a timing and a voltage for a graphics processing unit (GPU) chip are much lower than the maximum timing and voltage that the GPU chip can bear. In order to get different performances, a user can increase or decrease the operating rate of the graphics card. For example, when playing a PC game, the user can increase the operating rate of the graphics card to get a better performance, while when using two-dimensional software, a lower operating rate is sufficient to satisfy the user's desired performance. However, there are no systematic and safe methods for changing the operating rate of the graphics card in the prior art, so the user can only use trial and error to find an optimal setting for the graphics card, which wastes time, easily fails, and may damage the graphics card.

SUMMARY OF THE INVENTION

It is therefore a primary objective of the claimed invention to provide a method for adjusting an operating rate of a graphics card.

The present invention discloses a method for increasing an operating rate of a graphics card, which includes: raising a rotation rate of a radiator fan of a graphics processing unit chip of the graphics card to a first rotation rate according to a rate increasing command; raising a voltage inputted to the graphics processing unit chip to a first voltage, and raising a voltage inputted to a memory of the graphics card to a second voltage when the rotation rate of the radiator fan is approximately equal to the first rotation rate; and raising a timing of the graphics processing unit chip to a first timing, and raising a timing of the memory to a second timing when the voltage inputted to the graphics processing unit chip is approximately equal to the first voltage, the voltage inputted to the memory being approximately equal to the second voltage.

The present invention further discloses a method for decreasing an operating rate of a graphics card, which includes: decreasing a timing of a graphics processing unit chip of the graphics card to a first timing, and decreasing a timing of a memory of the graphics card to a second timing according to a command of decreasing rate; decreasing a voltage inputted to the graphics processing unit chip to a first voltage, and decreasing a voltage inputted to the memory to a second voltage when the timing of the graphics processing unit chip is approximately equal to the first timing; and decreasing a rotation rate of a radiator fan of the graphics processing unit chip to a first rotation rate when the voltage inputted to the graphics processing unit chip is approximately equal to the first voltage, the voltage inputted to the memory being approximately equal to the second voltage.

The present invention further discloses a method for adjusting an operating rate of a graphics card, which includes: providing a plurality of parameter settings according to hardware of the graphics card; and adjusting the operating rate of the graphics card according to a first setting and an original timing of a graphics processing unit chip of the graphics card when the first setting is selected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
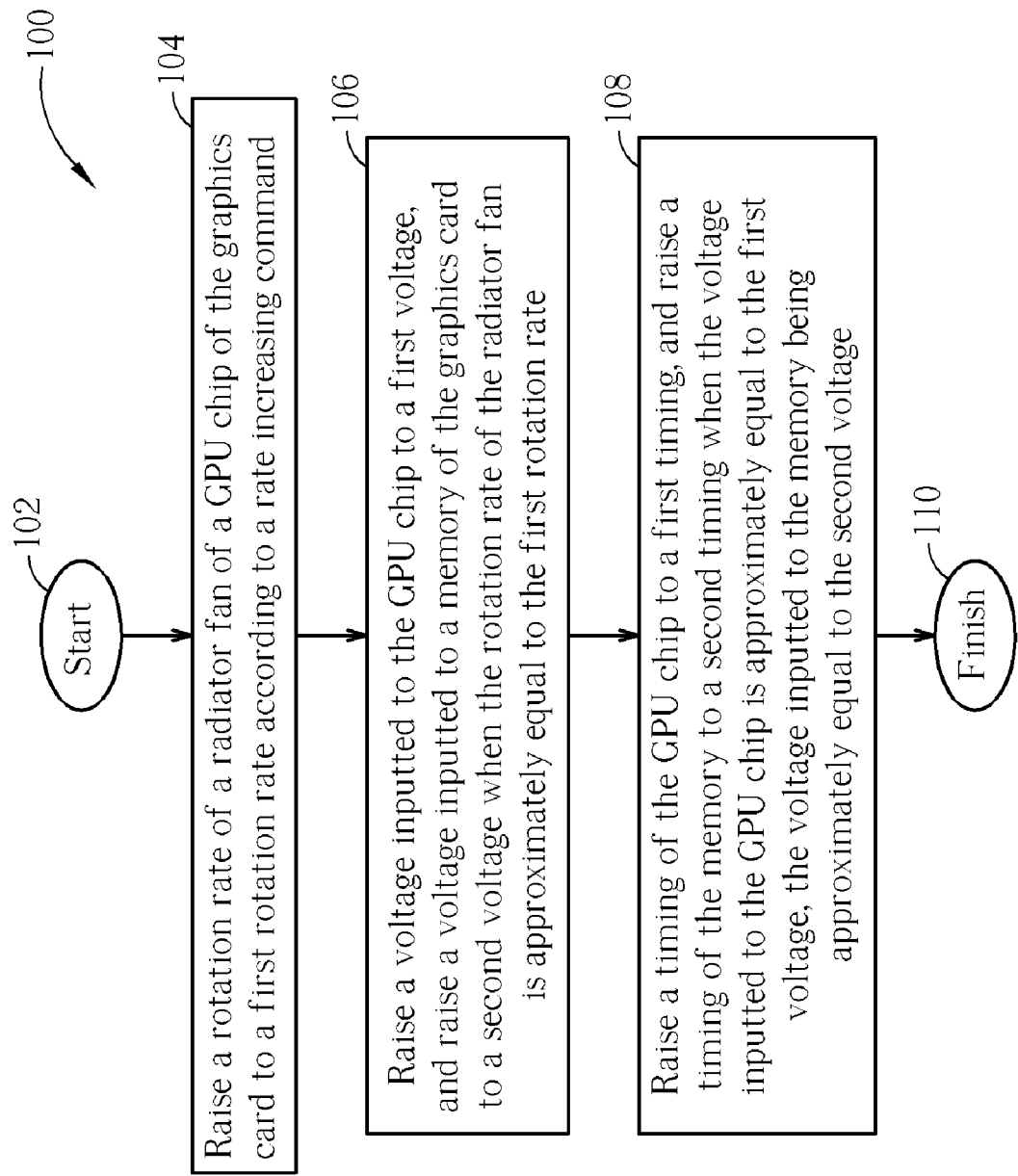
FIG. 1 illustrates a flowchart of a process for increasing an operating rate of a graphics card in accordance with the present invention.

Please refer to FIG. 1, which illustrates a flowchart of a process 100 for increasing an operating rate of a graphics card in accordance with the present invention. The process 100 includes following steps:

Step 102: start.

Step 104: raise a rotation rate of a radiator fan of a GPU chip of the graphics card to a first rotation rate according to a rate increasing command.

Step 106: raise a voltage inputted to the GPU chip to a first voltage, and raise a voltage inputted to a memory of the graphics card to a second voltage when the rotation rate of the radiator fan is approximately equal to the first rotation rate.

Step 108: raise a timing of the GPU chip to a first timing, and raise a timing of the memory to a second timing when the voltage inputted to the GPU chip is approximately equal to the first voltage, the voltage inputted to the memory being approximately equal to the second voltage.

Step 110: finish.

Therefore, according to the process 100, before increasing an operating rate of a graphics card, the present invention raises a rotation rate of a radiator fan of a GPU chip, so as to keep the GPU chip from becoming hotter when a timing and a voltage inputted to the GPU chip jumps up suddenly. After the rotation rate is raised, voltages of the GPU chip and a memory are increased to meet a higher timing of the GPU chip. Finally, as both of the rotation rate and the voltages are raised, the timings of the GPU chip and the memory are raised. In other words, the present invention process 100 changes the graphics card to a status that can meet a higher operating rate, and then raises the timings of the GPU chip and the memory. Therefore, the present invention can increase the operating rate easily and safely.

Figure 2:
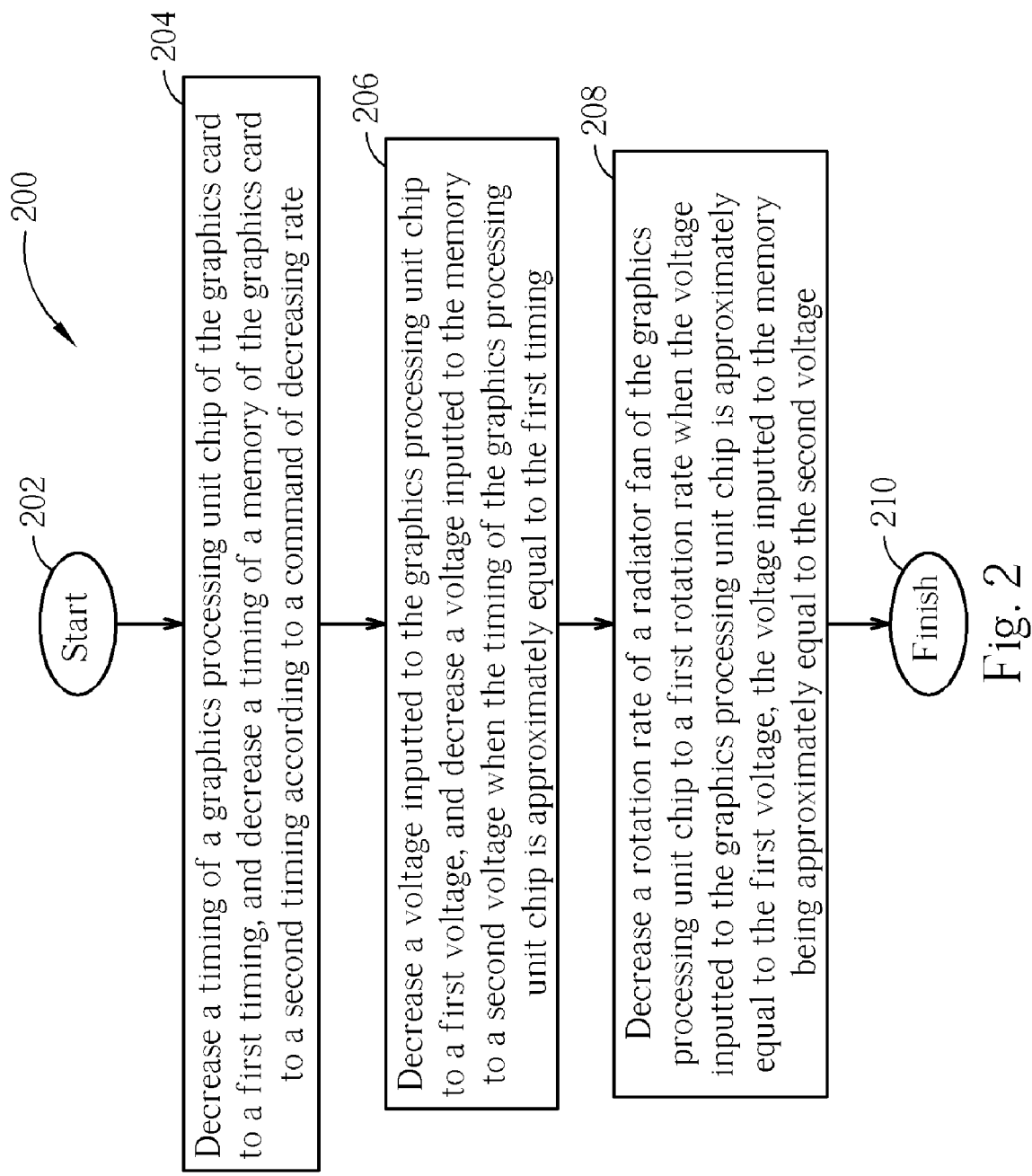
FIG. 2 illustrates a flowchart of a process for decreasing an operating rate of a graphics card in accordance with the present invention.

Oppositely, decreasing the operating rate of the graphics card can be performed in inverse of the process 100. Please refer to FIG. 2, which illustrates a flowchart of a process 200 for decreasing an operating rate of a graphics card in accordance with the present invention. The process 200 includes following steps:

Step 202: start.

Step 204: decrease a timing of a graphics processing unit chip of the graphics card to a first timing, and decrease a timing of a memory of the graphics card to a second timing according to a command of decreasing rate.

Step 206: decrease a voltage inputted to the graphics processing unit chip to a first voltage, and decrease a voltage inputted to the memory to a second voltage when the timing of the graphics processing unit chip is approximately equal to the first timing.

Step 208: decrease a rotation rate of a radiator fan of the graphics processing unit chip to a first rotation rate when the voltage inputted to the graphics processing unit chip is approximately equal to the first voltage, the voltage inputted to the memory being approximately equal to the second voltage.

Step 210: finish.

Therefore, according to the process 200, when decreasing an operating rate of a graphics card, the present invention decreases timings of a GPU chip and a memory first, then decreases voltages of the GPU chip and the memory, and finally, decreases a rotation rate of a radiator fan of the GPU chip. As a result, the radiator fan runs with a lower rotation rate, so as to decrease noise caused by wind shear.

In short, the higher the display efficiency of a graphics card is, the higher the operating rate of the graphics card and the temperature of a GPU chip in the graphics card will be. Therefore, the GPU chip must include a radiator mechanism, such as a radiator fin, a radiator fan, etc., for preventing the GPU chip from overheating and being damaged. However, a high-speed radiator fan generates loud noise. When a user wants to use the computer system quietly, the present invention process 200 can decrease the operating rate of the graphics card and the rotation rate of the radiator fan, so as to decrease noise.

Figure 3:
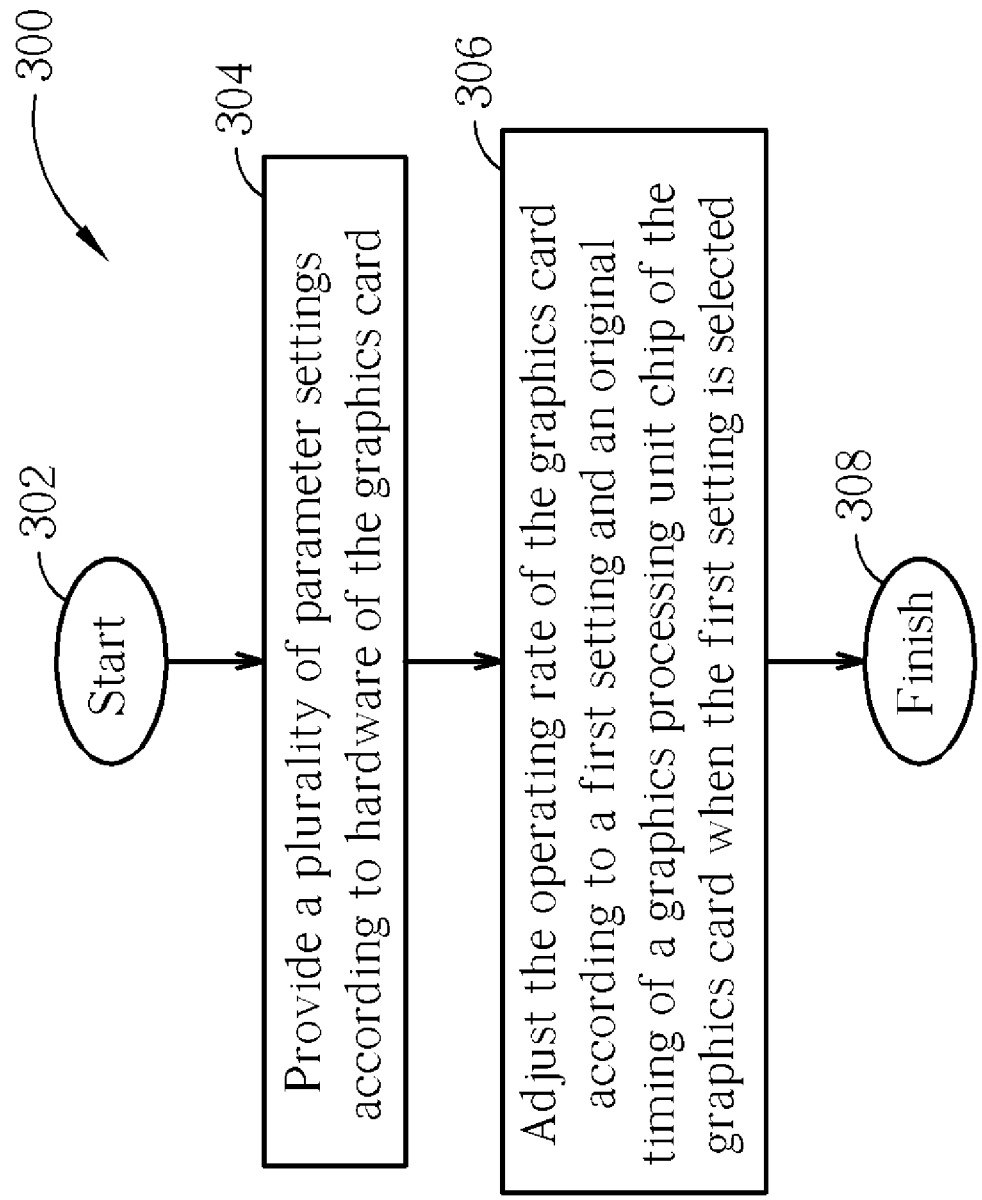
FIG. 3 illustrates a flowchart of a process for adjusting an operating rate of a graphics card in accordance with the present invention.

In the present invention, the process 100 can increase an operating rate of a graphics card safely, while the process 200 can decrease noise of a computer system. Therefore, according to the processes 100 and 200, the present invention further provides a method for adjusting an operating rate of a graphics card. Please refer to FIG. 3, which illustrates a flowchart of a process 300 for adjusting an operating rate of a graphics card in accordance with the present invention. The process 300 includes following steps:

Step 302: start.

Step 304: provide a plurality of parameter settings according to hardware of the graphics card.

Step 306: adjust the operating rate of the graphics card according to a first setting and an original timing of a graphics processing unit chip of the graphics card when the first setting is selected.

Step 308: finish.

Figure 4:
FIG. 4, which illustrates a table of settings for a graphics card in accordance with an embodiment of the present invention.

Therefore, the present invention 300 sets a plurality of settings according to hardware of a graphics card. When a user selects one of the settings, the present invention adjusts the graphics card according to the selected setting and the original setting of the graphics card. For example, please refer to FIG. 4, which illustrates a table 400 of settings for a graphics card in accordance with an embodiment of the present invention. The table 400 includes columns describing timings of a GPU chip and a memory, voltages of the GPU chip and the memory, and a rotation rate of a radiator fan. According to different operation demands, the table 400 provides five settings. For example, a setting 3 is a basic setting corresponding to normal users, a setting 1 is an ultrahigh frequency setting corresponding to high 3D efficiency, and a setting 5 is a silence setting for decreasing the rotation rate of the radiator fan. A setting 2 is the setting between the settings 1 and 3, while a setting 4 is the setting between the settings 3 and 5. Once the user selects one of the settings, the process 300 inspects the selected setting and the current setting of the graphics card, so as to increase the operating rate of the graphics card according to the process 100, or to decrease the operating rate of the graphics card according to the process 200. For example, if the original setting of the graphics card is the setting 3. When a user selects the setting 1 for getting higher 3D efficiency, the process 300 increases the operating rate of graphics card according to the process 100, so the rotation rate of the radiator fan will be raised first, then the voltages of the GPU chip and the memory, and finally the timings of the GPU chip and the memory. Oppositely, if the user changes settings from the setting 1 to the setting 5, the process 300 decreases the operating rate of graphics card according to the process 200, so the timings of the GPU chip and the memory will be decreased first, then the voltages of the GPU chip and the memory, and finally the rotation rate of the radiator fan. Therefore, for different operation demands, the present invention can fit the demands by increasing or decreasing the rotation rate of the radiator fan. Persons skilled in the art should note that the table 400 herein is exemplified for describing the settings of the graphics card. Various modifications could be made without departing from the spirit of the present invention.

Moreover, when adjusting the operating rate of the radiator fan, if the radiator fan cannot reach the expected speed, the present invention can decrease the timing of the GPU chip and the memory to a safe timing, and alarm the user that the radiator fan is abnormal. Furthermore, according to the temperature of the GPU chip, the present invention can fine-tune the rotation rate of the radiator fan.

In summary, the present invention provides a method for increasing the operating rate of the graphics card safely, and a method for decreasing noise generated by the graphics card. Therefore, users can choose settings for getting more 3D efficiency or a silent surrounding.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for increasing an operating rate of a graphics card comprising:

raising a rotation rate of a radiator fan of a graphics processing unit chip of the graphics card to a first rotation rate according to a rate increasing command;

raising a voltage inputted to the graphics processing unit chip to a first voltage, and raising a voltage inputted to a memory of the graphics card to a second voltage when the rotation rate of the radiator fan is approximately equal to the first rotation rate;

raising a timing of the graphics processing unit chip to a first timing, and raising a timing of the memory to a second timing when the voltage inputted to the graphics processing unit chip is approximately equal to the first voltage, the voltage inputted to the memory being approximately equal to the second voltage; and decreasing the timing of the graphics processing unit chip to a first reduced timing, and decreasing the timing of the memory to a second reduced timing when the rotation rate of the radiator fan is greatly lower than the first rotation rate.

2. The method of claim 1 further comprising fine-tuning the rotation rate of the radiator fan according to the temperature of the graphics processing unit chip.

3. A method for decreasing an operating rate of a graphics card comprising:

decreasing a timing of a graphics processing unit chip of the graphics card to a first timing, and decreasing a timing of a memory of the graphics card to a second timing according to a command of decreasing rate;

decreasing a voltage inputted to the graphics processing unit chip to a first voltage, and decreasing a voltage inputted to the memory to a second voltage when the timing of the graphics processing unit chip is approximately equal to the first timing;

decreasing a rotation rate of a radiator fan of the graphics processing unit chip to a first rotation rate when the voltage inputted to the graphics processing unit chip is approximately equal to the first voltage, the voltage inputted to the memory being approximately equal to the second voltage; and decreasing the timing of the graphics processing unit chip to a first reduced timing, and decreasing the timing of the memory to a second reduced timing when the rotation rate of the radiator fan is greatly lower than the first rotation rate.

4. The method of claim 3 further comprising fine-tuning the rotation rate of the radiator fan according to the temperature of the graphics processing unit chip.

* * * * *